(12) United States Patent
Escuret et al.

(10) Patent No.: US 6,755,617 B2
(45) Date of Patent: Jun. 29, 2004

(54) METHOD FOR THE EARLY DETECTION OF AERODYNAMIC INSTABILITIES IN A TURBOMACHINE COMPRESSOR

(75) Inventors: Jean-François Escuret, Gif sur Yvette (FR); Thierry Leconte, Combs la Ville (FR); Romuald Previtali, Lyons (FR)

(73) Assignee: SNECMA Moteurs, Paris (FR)

(*) Notice: Subject to any disclaimer, the term of this patent is extended or adjusted under 35 U.S.C. 154(b) by 243 days.

(21) Appl. No.: 09/771,971

(22) Filed: Jan. 30, 2001

(65) Prior Publication Data

US 2001/0014837 A1 Aug. 16, 2001

(30) Foreign Application Priority Data

Feb. 3, 2000  (FR) .............................................. 00 01345

(51) Int. Cl.[7] .............................................. F01B 25/00
(52) U.S. Cl. ........................ 416/168; 416/185; 416/187; 415/119; 415/200; 700/170
(58) Field of Search .............................. 415/119, 26, 47, 415/116, 118, 173.1, 185, 200, 221; 700/170; 416/168 A, 186, 188, 229

(56) References Cited

U.S. PATENT DOCUMENTS

| | | | |
|---|---|---|---|
| 4,578,756 A | | 3/1986 | Rosenbush et al. |
| 4,967,550 A | * | 11/1990 | Acton et al. ................ 415/119 |
| 5,275,528 A | | 1/1994 | Freeman et al. |
| 5,340,271 A | * | 8/1994 | Freeman et al. ............ 415/119 |
| 5,594,665 A | | 1/1997 | Walter et al. |
| 6,010,303 A | * | 1/2000 | Feulner ...................... 415/119 |
| 6,195,982 B1 | * | 3/2001 | Gysling et al. ............. 415/119 |

FOREIGN PATENT DOCUMENTS

| | | |
|---|---|---|
| EP | 0 597 440 A1 | 5/1994 |
| WO | WO 92/03661 | 3/1992 |
| WO | WO 96/34207 | 10/1996 |
| WO | WO 97/00381 | 1/1997 |

OTHER PUBLICATIONS

V.H. Garnier, et al. "Rotating Waves as a Stall Inception Indication in Axial Compressors" The American Society of Mechanical Engineers Jun. 11–14., 1990, pp. 1–12.

* cited by examiner

*Primary Examiner*—Leo Picard
*Assistant Examiner*—Charles Kasenge
(74) *Attorney, Agent, or Firm*—Oblon, Spivak, McClelland, Maier & Neustadt, P.C.

(57) ABSTRACT

A method for the early detection of aerodynamic instability in a turbomachine compressor is described which involves collecting and normalizing signals from sensors distributed uniformly around the circumference of the compressor and detecting events for which the normalized signals do not pass through a zero value during a length of time Tz which is at least greater than the time taken for two successive moving blades to travel past the sensor. A decision regarding the imminence of aerodynamic instability is then taken after the detected events have been analyzed and decision criteria have been applied. The decision criteria may be based on the event detection rate and/or on the spatio-temporal position of the events detected across all the sensors.

9 Claims, 10 Drawing Sheets

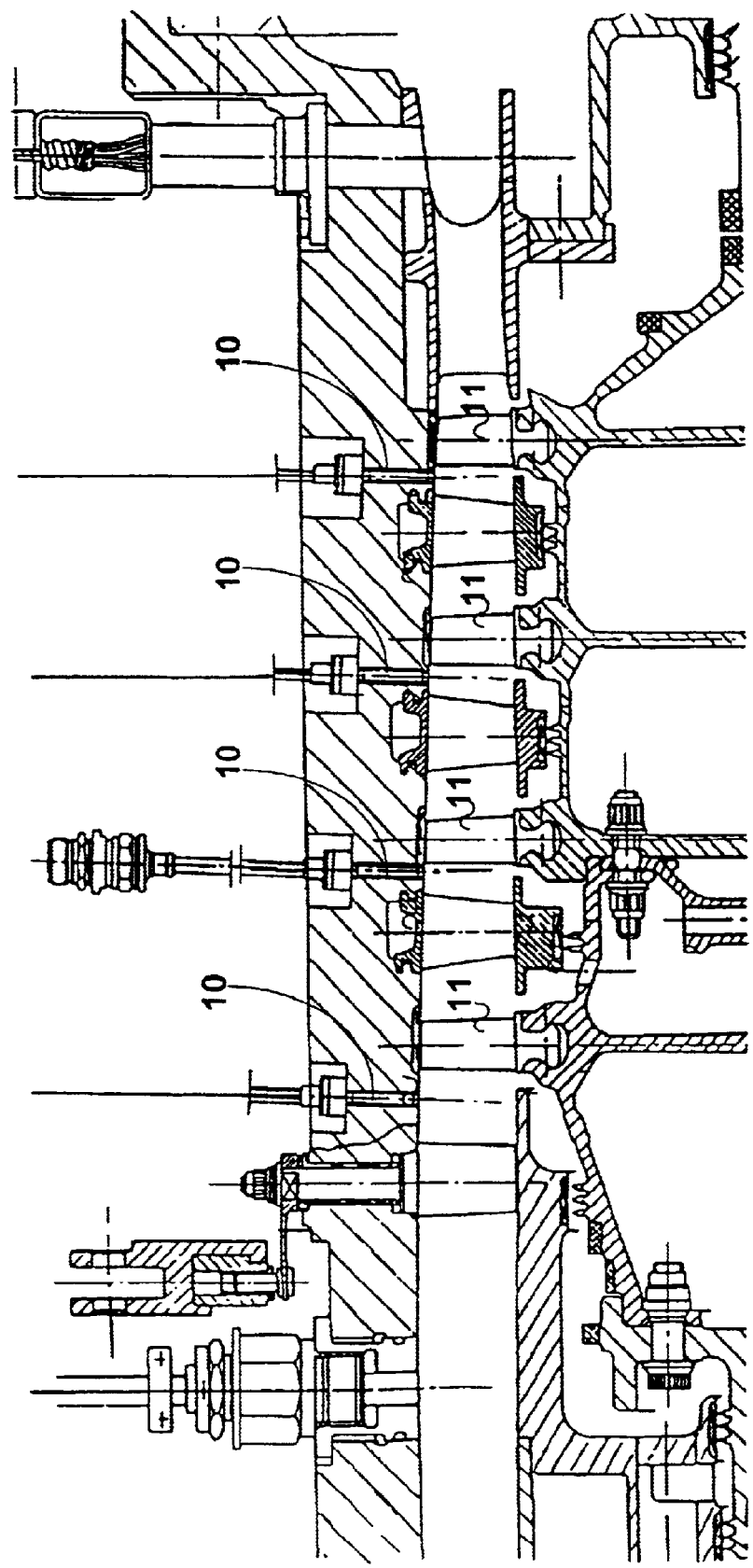
Fig : 1

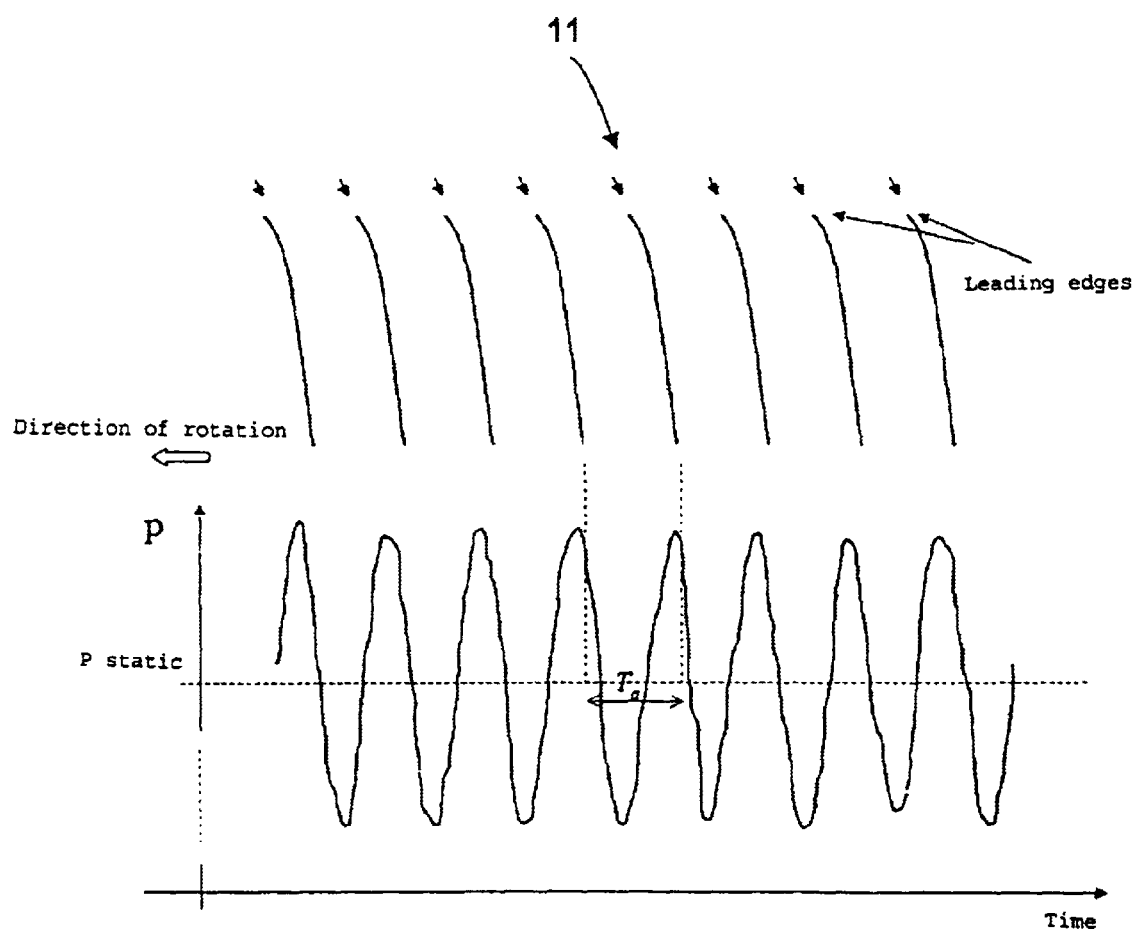
Fig : 2

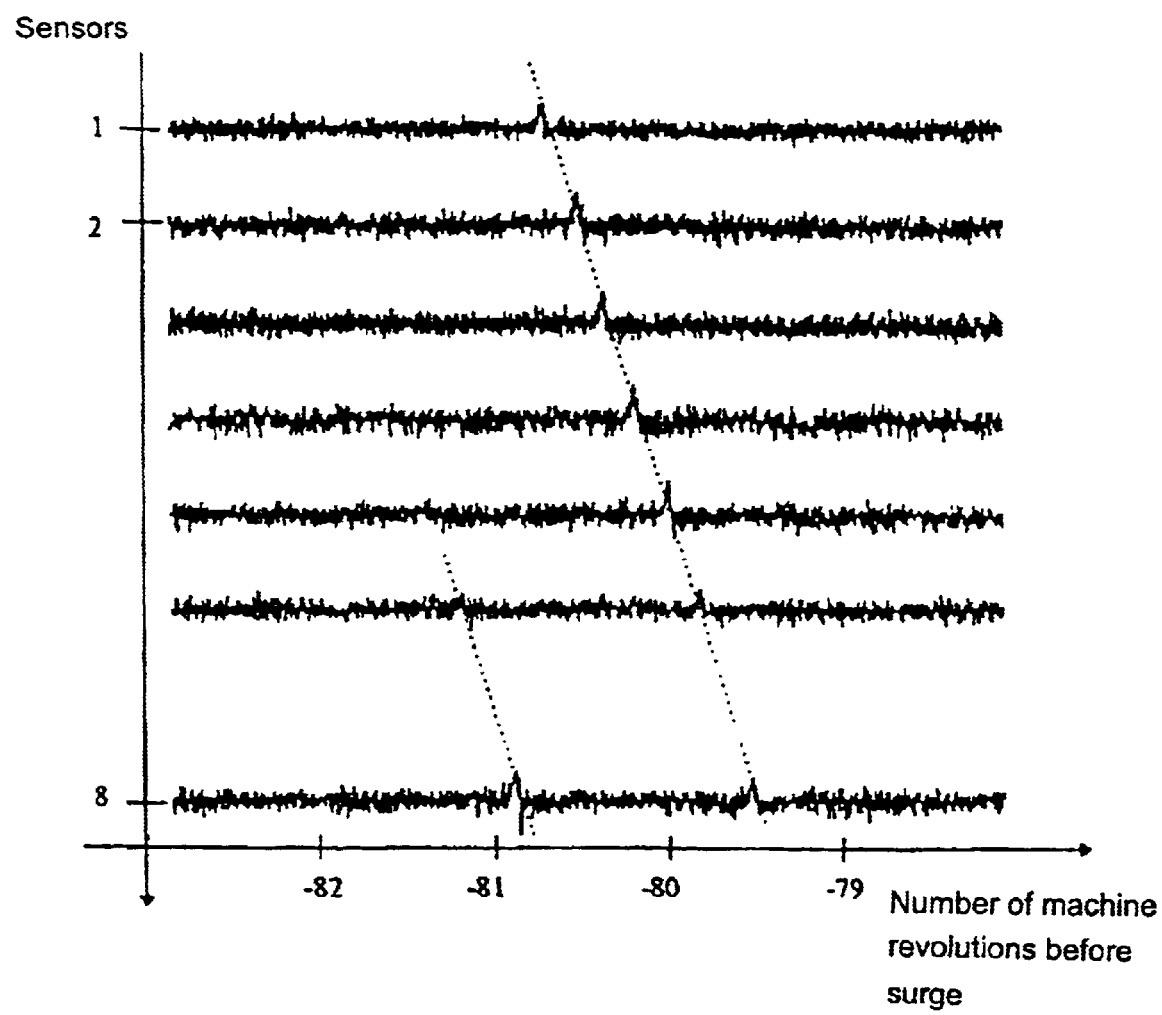
Fig : 3

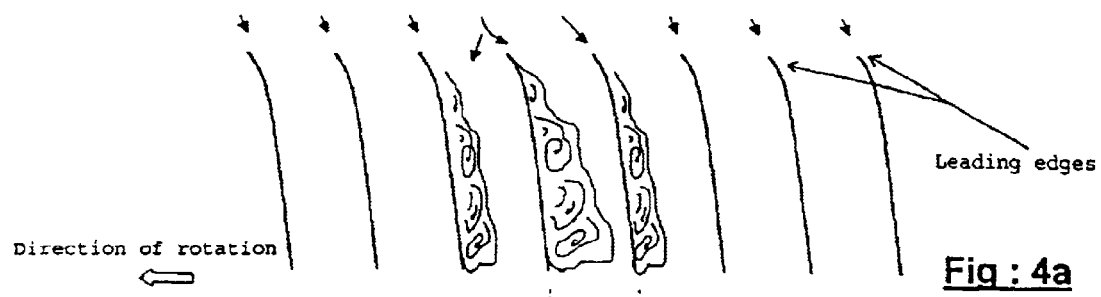
Fig : 4a
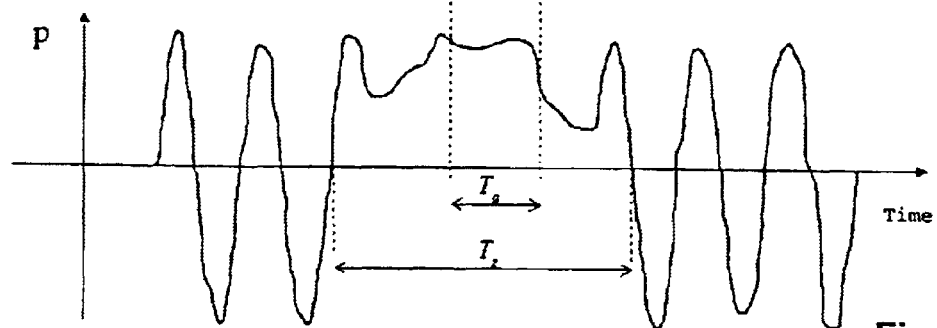
Fig : 4b

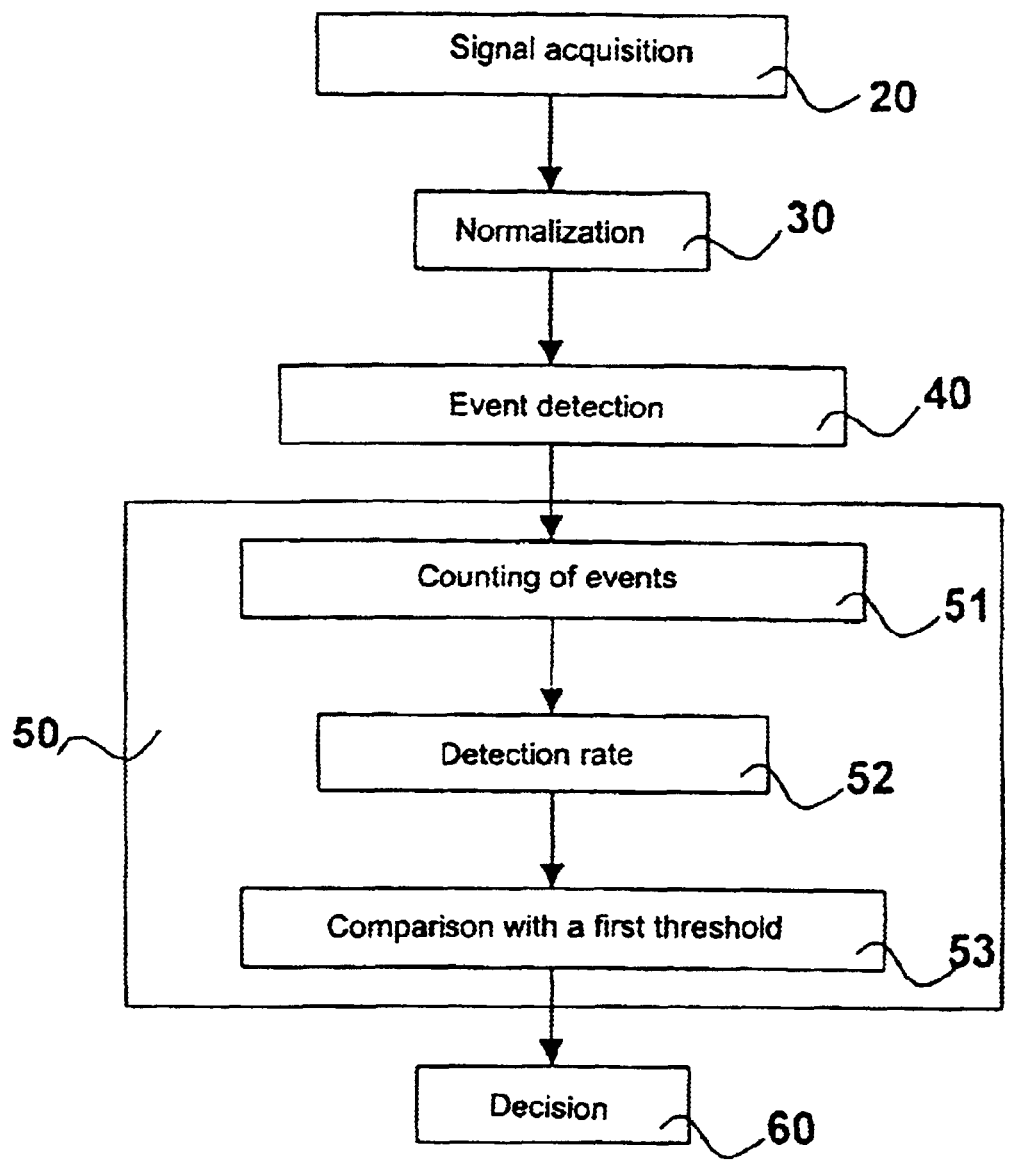

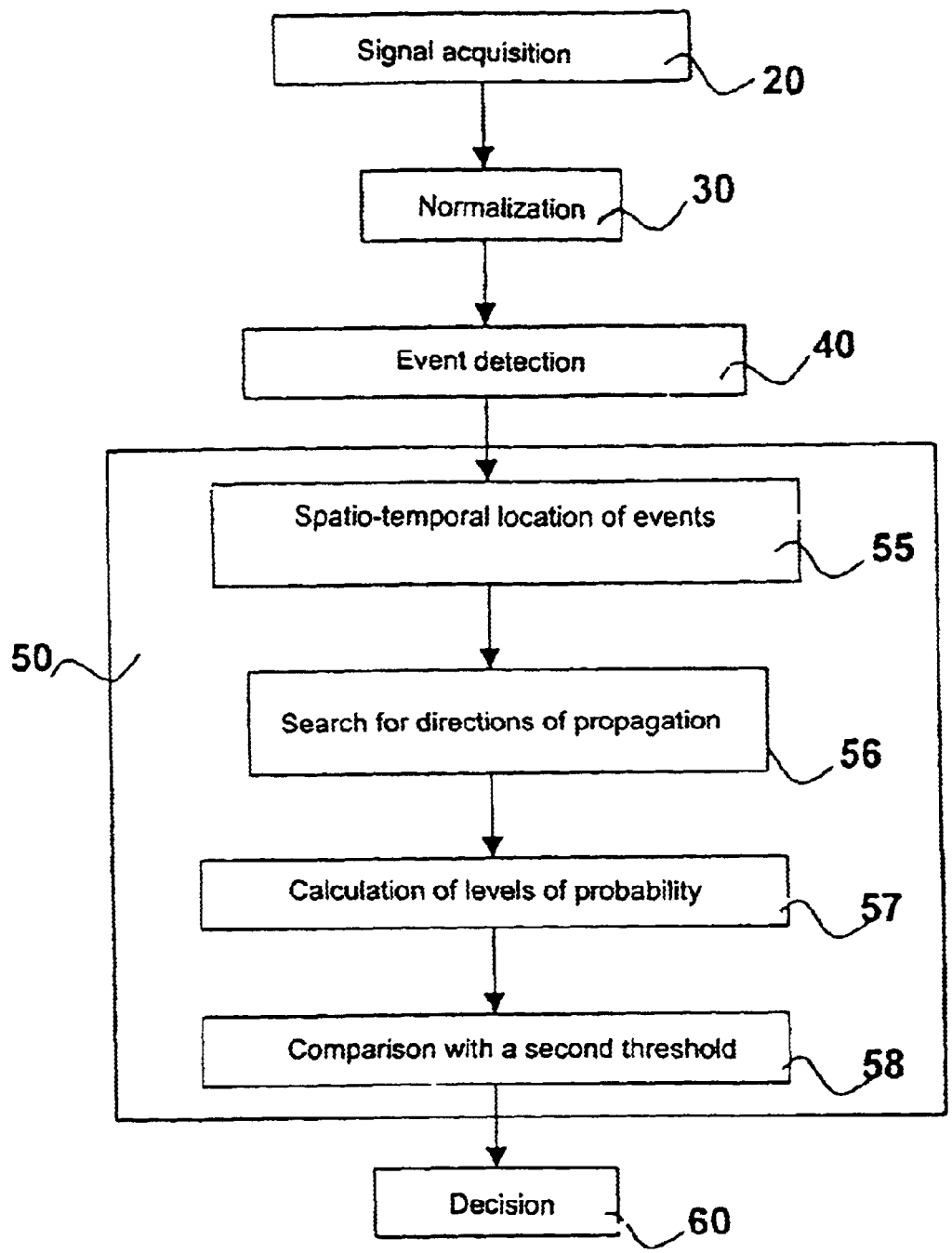
Fig : 6

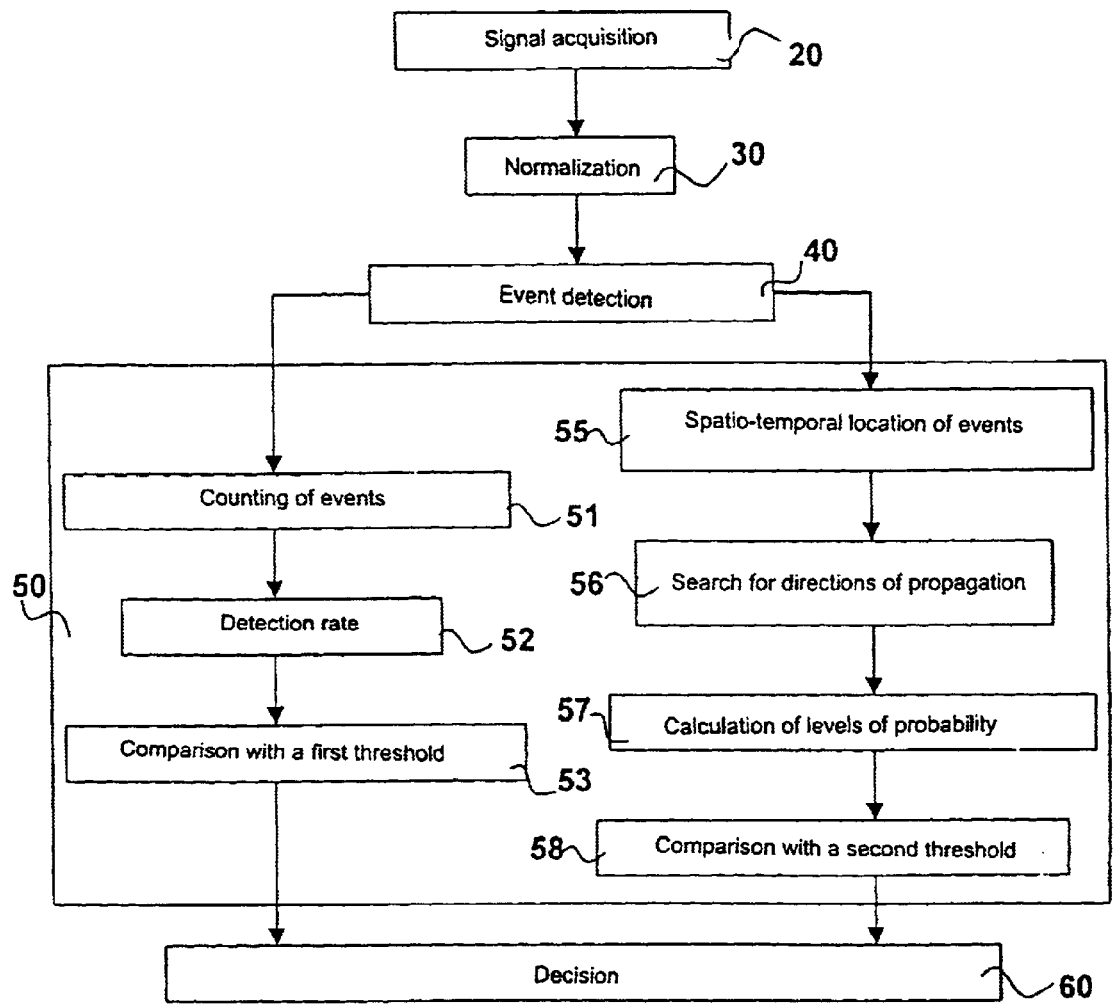
Fig : 7

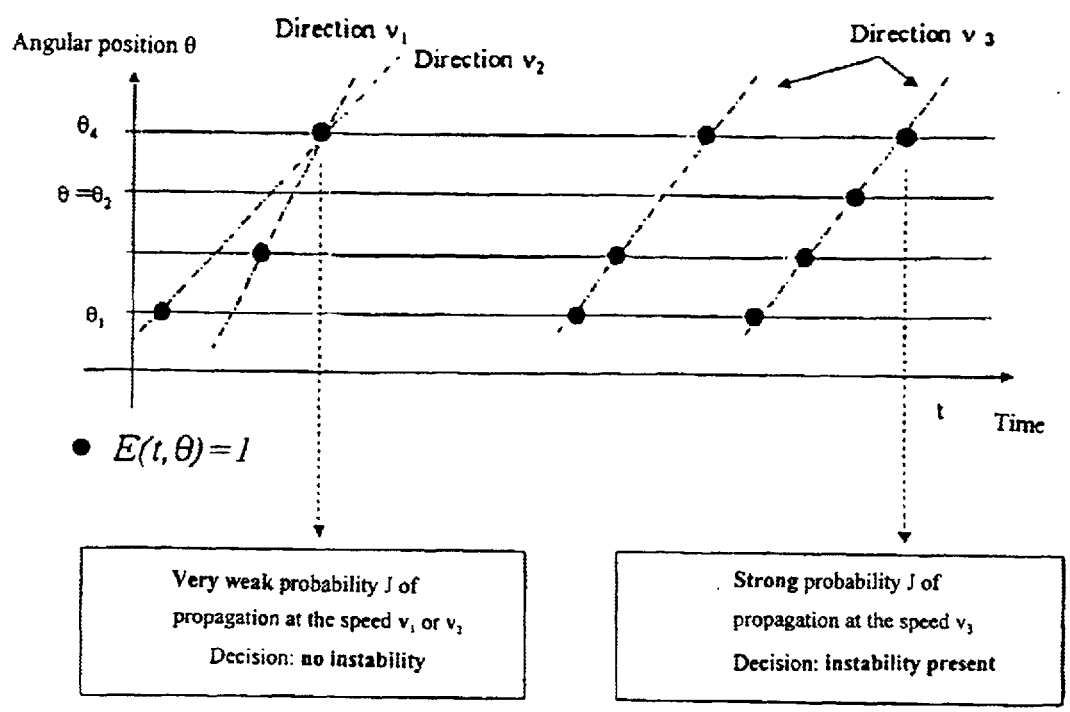
Fig : 8

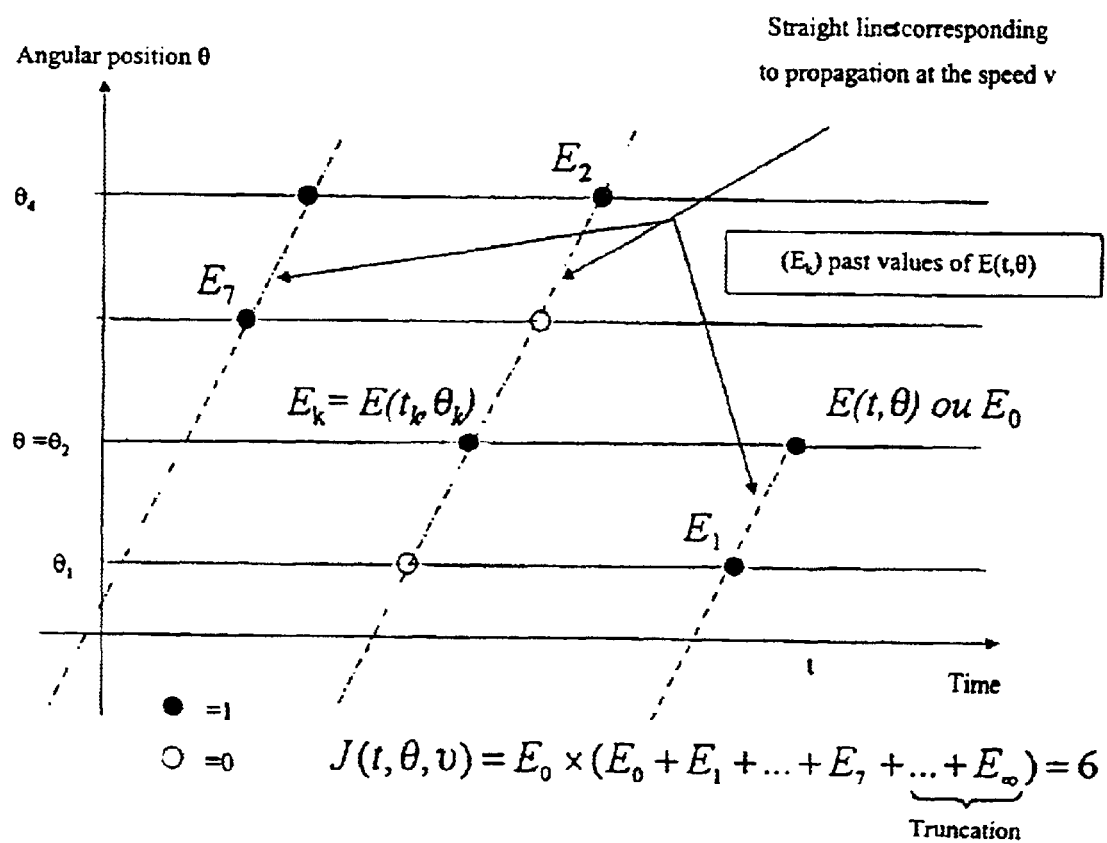
Fig : 9

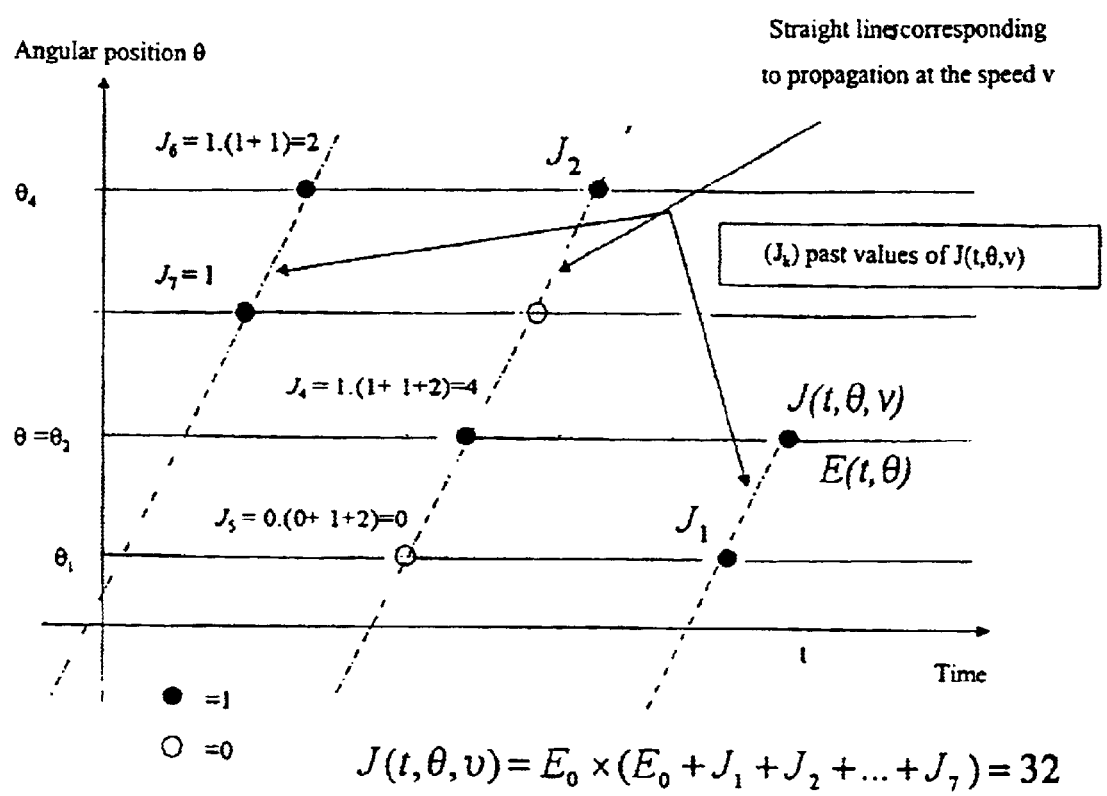
Fig : 10

METHOD FOR THE EARLY DETECTION OF AERODYNAMIC INSTABILITIES IN A TURBOMACHINE COMPRESSOR

BACKGROUND OF THE INVENTION

1. Technical Field

The invention relates to a method for the early detection of aerodynamic instabilities in a turbomachine compressor. It applies to any type of turbomachine and particularly to aircraft jet engines.

Under certain operating conditions, the compressor of a turbomachine may go into an unstable mode which causes damage ranging from a simple reduction in the working life of the parts of the engine to a complete stalling of the engine which may give rise to an accident. Aerodynamic instabilities, known by the name of revolving stall and surging, are conventionally encountered when the variations in engine operating conditions lead to an abrupt change in one of the compressor parameters such as the mass flow rate of fluid, the temperature or the outlet pressure.

Surging is characterized by mainly axial fluctuations in the flow through the compressor.

Revolving stall is a phenomenon which produces one or more localized zones, known as stall cells, which propagate in the circumferential direction in the cascades of the compressor blades at a fraction of the rotational speed of the compressor.

Depending on the nature of the cells, a distinction is drawn between part span stall and full span stall. Part span stall may be made up of several rotating cells constituting local perturbations which simultaneously affect only a restricted number of blades and which radially are restricted to a fraction of the compressor flow path.

In contrast, full span stall affects a radially and angularly larger region of the cascades of blades with greater variations in amplitude between healthy zones and stalled zones.

In general, the rate of propagation of the stall cells is higher in the case of a part span stall than in the case of a full span stall. The rate of propagation of the stall cells is of the order of 70 to 80% of the rotational speed of the compressor rotor in the case of a part span stall and about 40 to 50% in the case of a full span stall.

A distinction is drawn between two types of aerodynamic instability precursors known respectively as local perturbations and modal perturbations, and it is necessary to have effective methods of detection available for these two types of precursor.

Local perturbations are generally observed a few tens or a few hundreds of compressor revolutions before the instability extends to the entire compressor. However, they are difficult to detect because they are restricted to a limited number of blades and to a fraction of the span of the compressor flow path. They are of small amplitude and of highly random behavior: they may occur almost instantly, propagate for a fraction of a compressor revolution and then disappear without giving rise to any irreversible overall compressor instability. Furthermore, these local perturbations are characteristic of a situation for which, on approaching a zone of instability, a particular stage of the compressor reaches its aerodynamic load limit before the other stages, which entails the sensors preferably being placed near to this stage in order to be able to detect these local perturbations.

Modal perturbations also occur a few tens or a few hundreds of compressor revolutions before the instability. They are directly associated with the dynamic response to the fluctuations of the fluid flow in the entire compressor when the compressor reaches the maximum value on its characteristic curve expressing pressure as a function of flow rate. These modal perturbations are thus characteristic of a situation for which the various stages of the compressor together reach their aerodynamic load limit. Modal perturbations affect the entire circumference of the compressor at a given moment and are therefore relatively easier to detect than local perturbations because they are found at all the sensors.

2. Summary of the Prior Art

To solve the problems of aerodynamic instability, it is known practice to install preventive mechanical systems that make it possible to avoid the onset of instability. These mechanical systems may, for example, be adjustable inlet guide vanes, adjustable stators, and blow-off valves placed inside the compressors. These preventive systems do, however, impose operating constraints and significant limits on performance.

There also exist curative systems which make it possible to detect a surge situation and get out of it.

The technique of actively controlling instabilities which is used in most recent civilian and military engines consists of detecting an instability cycle when the latter occurs, and using this detection to trigger corrective action on compressor or engine parameters so as to get out of this zone of instability under the best possible conditions.

This technique does, however, carry a risk of damaging the engine and of leading to the loss of the aircraft on which it is mounted.

To improve the performance of engines while at the same time ensuring satisfactory levels of safety, it is known practice to employ another technique for actively controlling instabilities which allows the compressor operating point to remain for as long as possible in a zone close to the zone of unstable operation.

This technique for actively controlling instabilities consists of detecting precursors of aerodynamic instabilities which occur before the compressor enters a cycle of instability. These precursors may, for example, be variations in pressure, speed, or temperature which are detected in signals from sensors several compressor revolutions before the compressor enters a cycle of instability. If detection can be made early enough, corrective action to correct the operating point or the geometry of the compressor can be carried out before the instability actually occurs. This technique of actively controlling instabilities has the advantage that it is possible to operate with a far smaller surge margin because in real time it allows these instabilities to be prevented. However, the current methods of detecting instability precursors are difficult to implement and do not perform well because they are generally associated with the development of a detection threshold applied to the amplitude of the signals measured in a very noisy environment.

WO96/34207 describes a method that makes it possible to detect aerodynamic instability precursors and which consists of measuring the energy of the frequency signal at the frequency of rotation of the compressor, and then comparing this energy to an empirical threshold value developed from observations of signals obtained in healthy engines during acceleration.

However, only the energy of the signal at the frequency of rotation of the compressor is analyzed, and this is unable to detect all the precursors of instabilities which may occur at frequencies other than the rotational frequency of the compressor.

This is particularly troublesome because the rate of propagation of local perturbations is often lower than the rotational speed of the compressor.

SUMMARY OF THE INVENTION

The object of the invention is to determine a novel method for the early detection of aerodynamic instabilities in a turbomachine compressor which performs well, effectively, is simple to implement, and enables any perturbation to be detected regardless of its speed of propagation.

Accordingly, the invention provides a method for the early detection of instabilities in an aerodynamic flow in a turbomachine compressor including a rotor carrying rows of moving blades which rotate between rows of fixed blades, said method comprising the steps of:

a) collecting signals over a predetermined length of time from at least one sensor disposed at an angular position e on the circumference of the compressor between successive rows of fixed and moving blades;

b) normalizing the signals collected;

c) detecting, from the normalized signals, events for which the normalized signals have a property consisting of an absence of passage through a zero value during a length of time Tz at least greater than the time Ta taken for two successive moving blades to pass said sensor;

d) analyzing all of the detected events; and e) making a decision regarding the imminence of instability in the aerodynamic flow through the compressor according to the result of the analysis of the detected events.

In particular, the invention provides a method for detecting local perturbations which occur very early on in signals provided by pressure sensors or flow rate sensors arranged more or less uniformly around the circumference of the compressor between the rows of fixed and moving blades. The method involves detecting events characteristic of instability precursors and applying decision criteria to decide on the imminence of aerodynamic instability in the compressor. The decision may be taken on criteria based on the rate of detection of events characteristic of instability precursors. Alternatively, the decision may be taken on criteria based on the spatio-temporal position of the events detected across all of the sensors and on the evaluation of a level of probability of the presence of propagation of the local perturbations detected. The decision may also be taken on the above two criteria applied in succession or in parallel.

More particularly, in a first embodiment of the invention, the analysis of the detected events consists of:

counting the events detected by the sensors during a predetermined length of time greater than the length of time Ta taken for two successive blades to travel past the sensor so as to obtain an event detection rate; and comparing the detection rate value obtained with a predetermined threshold value so as to obtain at least a first indication about the imminence of instability.

In a second embodiment of the invention, the analysis of the detected events consists of:

determining the spatio-temporal location of the events detected from the normalized signals collected from at least two sensors distributed uniformly around the circumference of the compressor;

searching, in a time/azimuth frame $(t,\theta)$, for the directions of propagation of the events corresponding to propagation rates of between a zero value and a value equal to the rotational speed of the compressor rotor;

allocating, to each direction of propagation found, and to each event detected, a level of probability relating to the presence of spatial propagation of the detected event in the found direction; and comparing each level of probability with a second predetermined threshold value so as to obtain at least one indication about the imminence of instability.

In a third embodiment of the invention, the analysis of the detected events consists of:

counting the events detected by the sensors during a predetermined length of time greater than the length of time Ta taken for two successive blades to travel past the sensor so as to obtain an event detection rate;

comparing the detection rate value obtained with a first predetermined threshold value so as to obtain at least a first indication about the imminence of instability;

determining the spatio-temporal location of the events detected from the normalized signals collected from at least two sensors distributed uniformly around the circumference of the compressor;

searching, in a time/azimuth frame $(t,\theta)$, for the directions of propagation of the events corresponding to propagation rates of between a zero value and a value equal to the rotational speed of the compressor rotor;

allocating, to each direction of propagation found, and to each event detected, a level of probability relating to the presence of spatial propagation of the detected event in the found direction; and comparing each level of probability with a second predetermined threshold value so as to obtain at least one indication about the imminence of instability.

Other preferred features and advantages of the invention will become apparent from the following description of the preferred embodiments, which is given by way of non limiting example and with reference to the appended drawings.

BRIEF DESCRIPTION OF THE DRAWINGS

FIG. 1 shows a part sectional view of one embodiment of a turbomachine compressor equipped with rapid response pressure sensors for carrying out the method according to the invention.

FIG. 2 shows an example of a pressure signal provided by a sensor placed upstream of the leading edges of the blades of the compressor rotor.

FIG. 3 shows an example of normalized pressure signals collected from various sensors several compressor revolutions prior to the onset of a surge cycle.

FIG. 4(a) illustrates the propagation of a revolving stall cell in a cascade of blades; and, FIG. 4(b) illustrates the pressure signal provided by a sensor at the onset of the revolving stall cell.

FIG. 5 is a flow diagram showing the main steps of a first embodiment of the method according to the invention.

FIG. 6 is a flow diagram showing the main steps of a second embodiment of the method of the invention.

FIG. 7 is a flow diagram showing the main steps of a third embodiment of the method of the invention.

FIGS. 8, 9 and 10 show three examples of the application of the method according to the invention.

DESCRIPTION OF THE PREFERRED EMBODIMENTS

As shown in FIG. 1, sensors 10 are placed upstream of the rows of blades 11 of the compressor rotor as close as possible to the leading edges of the blades and more or less uniformly distributed around the circumference of the compressor so as to optimize the probability of observing stall cells. The sensors used are, by nature, rapid response sensors, that is to say capable of detecting fast variations in pressure or speed, but for convenience the remainder of this description refers to embodiments using pressure sensors. The behavior observed using speed sensors is similar, but with variations in the opposite sense.

FIG. 2 illustrates a cascade of blades 11 and the pressure signal P provided by a sensor placed upstream of the leading edges of the rotor blades during healthy and therefore stable operation of the compressor.

This signal comprises a static component $P_{static}$ which, in the case of a pressure sensor, corresponds to an increase in pressure achieved by each stage of the compressor. The change around this static component is more complex. A spectral analysis, not depicted, shows the presence of numerous frequencies, particularly the harmonics of the rotational speed, as well as a main contribution at the blade passage frequency.

This can be interpreted as follows. If we consider a cascade in which there is only one blade, its local contribution to the signal provided by the pressure sensor (which is fixed) will be visible only once each revolution. If the period of a revolution is denoted Tr, this contribution occurs every Tr seconds, and therefore at the rotational frequency Fr equal to 1/Tr. In the more general case of a cascade in which there are Na blades, if the system is a perfect system then each blade makes the same contribution in succession. Thus, the signal provided by the pressure sensor detects the same contribution Na times during one revolution, namely a contribution at the blade passage frequency Fa(1/Ta) equal to Na/Tr.

This contribution can be characterized simply by considering that the passage of the leading edge of the blade causes a local increase in pressure followed by a reduction.

When the pressure signal is normalized, it is found that the normalized signal corresponding to normal operation of the compressor passes regularly through a zero value, that is to say that the pressure signal corresponding to the length of time taken for two successive blades to travel past the sensor has at least one change of sign.

The signal is normalized by adaptive filtering of the signal, which consists of removing the static component consisting of the mean value of the signal and then dividing the result obtained by the signal variance.

FIG. 3 depicts an example of normalized pressure signals provided by each sensor several compressor revolutions before the onset of a surge cycle. In this figure, pressure peaks which occur 80 revolutions before the onset of surge can be seen. These peaks, which are visible on the signals provided by all the sensors, are local perturbations which propagate at a fraction of the rotational speed of the compressor.

The local perturbations which precede the onset of surge correspond to a part span stall propagated across several blades over a short period of time.

The issue is therefore one of determining a method which allows these perturbations to be systematically detected.

FIG. 4(a) depicts a cascade of blades affected by the propagation of a revolving stall cell, and FIG. 4(b) depicts the pressure signal P provided by a sensor upon the onset of the revolving stall cell.

At the onset of a stall cell in the passage between successive blades, the contributions of the blades of the stalled passage to the signal from the sensors are greatly modified. Specifically, the stalled cell takes the form of a local and momentary obstruction of the passage between the blades.

The modification of the pressure signal consists of an absence of the signal passing through the zero value for a period of time Tz which is longer than the time Ta taken for two successive blades to travel past one and the same sensor.

This absence of the signal passing through zero constitutes the signature of a stall cell on the normalized pressure signal and is used as an attribute of the aerodynamic instability precursors in the compressor.

As depicted in FIGS. 5 to 7, the method according to the invention consists of determining, from the acquired 20 and normalized 30 pressure signals from each sensor, all the events 40 that satisfy this property of non-passage through zero.

The result of the detection of events 40 by a sensor located at an angular position e on the circumference of the compressor, and at the instant t, is represented by the function E(t,θ), where E(t,θ) adopts the logic value 1 when the property of non-passage of the pressure signal through zero is satisfied and the value 0 when it is not.

Although the speed of propagation of the peaks corresponds to a low frequency in comparison with the frequency corresponding to the rate of passage of the compressor rotor blades, in order to evaluate the property of non-passage of the signal through zero, the pressure signal sampling frequency has to be high enough, that is to say higher than at least two and a half times the blade passage frequency, so as to allow systematic detection of these peaks.

The invention then involves analyzing 50 all of the detected events so as to be able to decide 60 on the imminence of aerodynamic instability.

Various types of analysis may be performed.

For example, as depicted in FIG. 5, event analysis may consist of counting 51 the events detected by the sensors in a certain predetermined period of time longer than the time Ta taken for two successive blades to travel past the sensor, and determining the event detection rate 52. The detection rate value obtained is then compared with a first predetermined threshold value 53 to obtain at least a first indication about the imminence of instability. Specifically, the higher the number of stall cells that occur, the greater is the probability of this leading to aerodynamic instability. A decision 60 can then be taken regarding the stability of the aerodynamic flow.

The advantage of this analysis is that it makes it possible to obtain a quick first estimate of the stability of the flow from just one pressure signal delivered by just one sensor. However, this first approximation is more reliable if the number of sensors is higher.

Another type of analysis that makes it possible to obtain a more reliable estimate can be carried out when several sensors are distributed evenly around the circumference of the compressor. The various steps in this type of analysis are indicated in FIG. 6 and the operation of one embodiment with four sensors uniformly distributed about the circumference of the compressor is depicted in FIG. 8. This analysis consists of detecting the spatio-temporal location 55 of the detected events, and then searching for the directions of propagation 56 of the perturbations corresponding to each detected event from the signals provided by all the sensors by scanning the speeds between 0 and the rotational speed of the compressor rotor and looking, in the case of each examined speed value, for the detected events which are aligned in the direction of propagation corresponding to this speed. In the example of FIG. 8, 10 events have been detected for the angular positions θ1, θ2, θ3, θ4 of the four sensors and three directions of propagation corresponding to the speeds v1, v2, v3 have been adopted. A level of probability J, 57, relating to the presence of spatial propagation of local perturbations at a fraction of the rotational speed of the compressor rotor is then allocated to each direction of propagation found. For each event located in time and space, the level of probability J is a function dependent on the time t, the spatial position θ and the speed of propagation v.

Various criteria can be used to determine the level of probability J0(t,θ,v) for an event detected at the time t, at the position θ, and at the speed v. All these criteria must, however, be a function of the number of events detected prior to the event in question in the direction of propagation corresponding to the speed v.

If the number of events detected beforehand at the speed v is zero, that is to say if all the earlier Ek values (where k is a positive whole number) are equal to 0, then the level of probability must be zero. This is because there is no chance that there will be propagation of perturbations in a direction corresponding to a speed v if no event has been detected in this direction.

By contrast, if all the earlier Ek values are equal to 1, then the level of probability must be at a maximum. FIG. 8 shows that of the 10 events detected, two events are aligned in the direction of propagation v1 and in the direction of propagation v2, while 7 events are aligned in the direction of propagation v3. In consequence, the level of probability J of propagation at the speed v1 and v2 must be low and lead to a decision that there is an absence of instability, whereas the level of probability of propagation at the speed v3 must be high and lead to a decision that instability is present.

As there are, in theory, an infinite number of earlier values, it is necessary to make an approximation involving only a finite number of earlier values.

The approximation can be made using truncation considering only a certain predetermined number m of earlier values, as represented, for example, in FIG. 9, where m=7. In this case, the level of probability J is a function of the earlier values Ek considered. For example, the level of probability J may be chosen equal to the value of the event E0 considered, weighted by the sum of the values of the earlier events Ek and restricting the analysis to the last m events detected:

$$J0(t, \theta, v) = E0(t, \theta, v) \left( \sum_{k=0}^{k=m-1} Ek(t, \theta, v) \right)$$

The factor E0(t,θ,v) allows J to be allocated a zero value when no event has been detected in (t,θ). In the example depicted in FIG. 9, J=6.

This approximation has the advantage of being quick and easy to implement but incorporates only a limited number m of earlier values and makes no distinction of continuity of the events detected.

Another type of approximation can be made using a recursive method incorporating infinite dependency on earlier Ek values but considering only a finite number m of probability level values as depicted, for example, in FIG. 10. In this example, the level of probability J(t,θ,v) is a function of the earlier values Jk calculated for events propagating in the direction of propagation corresponding to the speed v:

$$J0(t, \theta, v) = E0(t, \theta, v) \times \left( E0(t, \theta, v) + \sum_{k=1}^{k=m-1} Jk(t, \theta, v) \right)$$

In the example depicted in FIG. 10, with a restriction to the last seven events detected (m=7), J7=1; J6=2; J5=0; J4=4; J3=0; J2=8; J1=16; J0(t,θ,v)=32.

The advantage of this approximation is that it makes it possible to take account of the contribution of an infinite number of earlier values of the detected events, but it is more costly than the approximation carried out with reference to FIG. 9 because it entails storing the past values of the level of probability calculated on each iteration for each speed of propagation. Incidentally, as in the example of FIG. 9, this approximation is not able to make a distinction on the continuity of the events detected.

In order to take account of the continuity of the events detected in determining the level of probability, it is necessary to choose functions other than a simple sum. These functions need to be chosen so that detection of a propagation of an event in a direction v by several successive sensors becomes more critical than discontinuous propagation detected by the same number of sensors.

For example, it might be possible to choose a function consisting of weighting the sum of the earlier Jk values which is used in the recursive method by a neglection value denoted λk, where λk is a positive number strictly lower than 1. For example:

$$J0(t, \theta, v) = E0(t, \theta, v) \times \left( E0(t, \theta, v) + \sum_{k=1}^{k=m-1} \lambda k \; Jk(t, \theta, v) \right)$$

m being the number of events to which the analysis is restricted.

This weighting makes it possible to accord lower importance to discontinuous propagation than to continuous propagation.

Whatever the method chosen for estimating the level of probability, the level of probability is then compared 58 with a second predetermined threshold value so as to obtain a second estimate on the aerodynamic stability of the compressor. The threshold value is different for each of the methods described hereinabove. For example, the threshold value may be defined in such a way that local perturbation propagation detected continuously over more than one half of the circumference of the compressor triggers a signal indicating the early detection of surge.

The decision 60 in favor of the existence of propagation is taken if the maximum value of J at a given instant is higher than or equal to the chosen threshold value.

As depicted in FIG. 7, the two types of analysis described hereinabove may also be carried out in parallel so as to obtain two indications on the aerodynamic stability of the compressor before a decision is taken.

What is claimed is:

1. A method for the early detection of instabilities in an aerodynamic flow in a turbomachine compressor including a rotor carrying rows of moving blades which rotate between rows of fixed blades, said method comprising the steps of:
    a) collecting signals over a predetermined length of time from at least one sensor disposed at an angular position θ on a circumference of the compressor between successive rows of fixed and moving blades;
    b) normalizing the signals collected;
    c) detecting, from the normalized signals, events for which the normalized signals have a property including an absence of passage through a zero value during a length of time Tz at least greater than the time Ta taken for two successive moving blades to pass said sensor;
    d) analyzing all of the detected events; and
    e) making a decision regarding an imminence of instability in the aerodynamic flow through the compressor according to a result of the analysis of the detected events.

2. A method for the early detection of instabilities in an aerodynamic flow in a turbomachine compressor including a rotor carrying rows of moving blades which rotate between rows of fixed blades, said method comprising the steps of:

a) collecting signals over a predetermined length of time from at least one sensor disposed at an angular position θ on a circumference of the compressor between successive rows of fixed and moving blades;

b) normalizing the signals collected;

c) detecting, from the normalized signals, events for which the normalized signals have a property including an absence of passage through a zero value during a length of time Tz at least greater than the time Ta taken for two successive moving blades to pass said sensor;

d) analyzing all of the detected events; and e) making a decision regarding an imminence of instability in the aerodynamic flow through the compressor according to a result of the analysis of the detected events, wherein the result of the detection of events at an instant t by a sensor at position θ is represented by a function E(t,θ) which adopts a logic value 1 or 0 according to whether or not the property of absence of passage through zero during the length of time Tz is satisfied.

3. A method for the early detection of instabilities in an aerodynamic flow in a turbomachine compressor including a rotor carrying rows of moving blades which rotate between rows of fixed blades, said method comprising the steps of:

a) collecting signals over a predetermined length of time from at least one sensor disposed at an angular position θ on a circumference of the compressor between successive rows of fixed and moving blades;

b) normalizing the signals collected;

c) detecting, from the normalized signals, events for which the normalized signals have a property including an absence of passage through a zero value during a length of time Tz at least greater than the time Ta taken for two successive moving blades to pass said sensor;

d) analyzing all of the detected events; and e) making a decision regarding an imminence of instability in the aerodynamic flow through the compressor according to a result of the analysis of the detected events, wherein said step of analyzing the detected events includes:

counting the events detected by the at least one sensor during a predetermined length of time greater than the length of time Ta taken for two successive blades to travel past the sensor so as to obtain an event detection rate; and comparing the event detection rate with a first predetermined threshold value so as to obtain at least a first indication about the imminence of instability.

4. A method for the early detection of instabilities in an aerodynamic flow in a turbomachine compressor including a rotor carrying rows of moving blades which rotate between rows of fixed blades, said method comprising the steps of:

a) collecting signals over a predetermined length of time from at least one sensor disposed at an angular position θ on a circumference of the compressor between successive rows of fixed and moving blades;

b) normalizing the signals collected;

c) detecting, from the normalized signals, events for which the normalized signals have a property including an absence of passage through a zero value during a length of time Tz at least greater than the time Ta taken for two successive moving blades to pass said sensor;

d) analyzing all of the detected events; and e) making a decision regarding an imminence of instability in the aerodynamic flow through the compressor according to a result of the analysis of the detected events, wherein said step of analyzing the detected events includes:

determining a spatio-temporal location of the events detected from the normalized signals collected from at least two sensors distributed uniformly around the circumference of the compressor;

searching, in a time/azimuth frame (t,θ), for directions of propagation of the events corresponding to propagation rates of between a zero value and a value equal to a rotational speed of the compressor rotor;

allocating, to each direction of propagation found, and to each event detected, a level of probability relating to a presence of spatial propagation of the detected event in the found direction; and comparing each level of probability with a second predetermined threshold value so as to obtain at least one indication about the imminence of instability.

5. The method for the early detection of instabilities in an aerodynamic flow as claimed in claim 3, wherein said steps of analyzing the detected events further includes:

determining a spatio-temporal location of the events detected from the normalized signals collected from at least two sensors distributed uniformly around the circumference of the compressor;

searching, in a time/azimuth frame (t,θ), for directions of propagation of the events corresponding to propagation rates of between a zero value and a value equal to a rotational speed of the compressor rotor;

allocating, to each direction of propagation found, and to each event detected, a level of probability relating to a presence of spatial propagation of the detected event in the found direction; and comparing each level of probability with a second predetermined threshold value so as to obtain at least one indication on the imminence of instability.

6. The method for the early detection of instabilities in an aerodynamic flow as claimed in claim 4, wherein a level of probability J0 (t,θ, v) for an event E0 detected at the time t, at the angular position θ, and propagating at the angular speed v, is a function of a number of events detected prior to the event E0 in question, in the direction of propagation corresponding to the speed v.

7. The method for the early detection of instabilities in an aerodynamic flow as claimed in claim 4, wherein a level of probability J0 (t,θ, v) for an event E0 detected at the time t, at the angular position θ, and propagating at the angular speed v, is a function of earlier levels of probability Jk(t,θ, v) (where k is a positive whole number) calculated for the events detected prior to the event E0 and propagating at the angular speed v.

8. The method for the early detection of instabilities in an aerodynamic flow as claimed in claim 5, wherein a level of probability J0(t,θ, v) for an event E0 detected at the time t, at the angular position θ, and propagating at the angular speed v, is a function of a number of events detected prior to the event E0 in question, in the direction of propagation corresponding to the speed v.

9. The method for the early detection of instabilities in an aerodynamic flow as claimed in claim 5, wherein a level of probability J0(t,θ, v) for an event E0 detected at the time t, at the angular position θ, and propagating at the angular speed v, is a function of the earlier levels of probability Jk(t,θ, v) (where k is a positive whole number) calculated for the events detected prior to the event E0 and propagating at the angular speed v.

* * * * *

UNITED STATES PATENT AND TRADEMARK OFFICE
CERTIFICATE OF CORRECTION

PATENT NO. : 6,755,617 B2
DATED : June 29, 2004
INVENTOR(S) : Jean-Francois Escuret et al.

Page 1 of 1

It is certified that error appears in the above-identified patent and that said Letters Patent is hereby corrected as shown below:

Column 3,
Line 14, change "e" to -- $\theta$ --.

Column 6,
Line 13, change "e" to -- $\theta$ --.

Column 7,
Line 2, change "e" to -- $\theta$ --.

Signed and Sealed this

Twenty-first Day of June, 2005

JON W. DUDAS
*Director of the United States Patent and Trademark Office*